Sept. 15, 1942.     J. H. DOWNING     2,296,152
DEVICE FOR HANDLING PHOTOGRAPHIC NEGATIVES
Filed Nov. 20, 1940     4 Sheets-Sheet 1

INVENTOR.
JOHN H. DOWNING
BY
HIS ATTORNEY

Sept. 15, 1942.   J. H. DOWNING   2,296,152
DEVICE FOR HANDLING PHOTOGRAPHIC NEGATIVES
Filed Nov. 20, 1940   4 Sheets-Sheet 2

INVENTOR.
JOHN H. DOWNING
BY
HIS   ATTORNEY

Sept. 15, 1942. J. H. DOWNING 2,296,152
DEVICE FOR HANDLING PHOTOGRAPHIC NEGATIVES
Filed Nov. 20, 1940 4 Sheets-Sheet 3
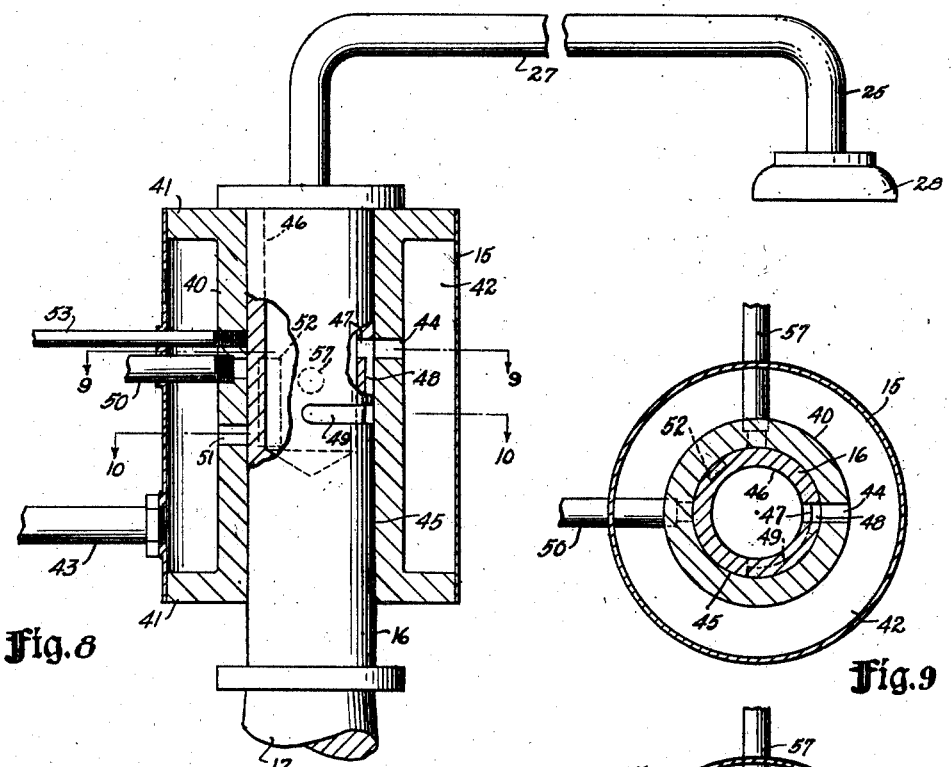
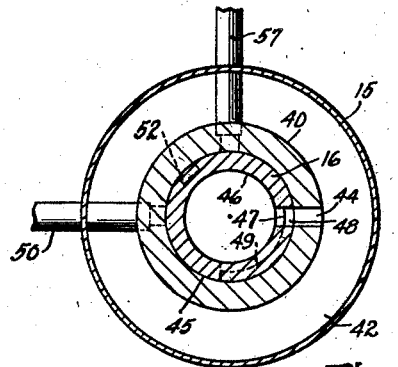
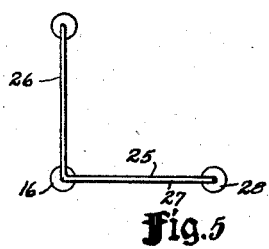
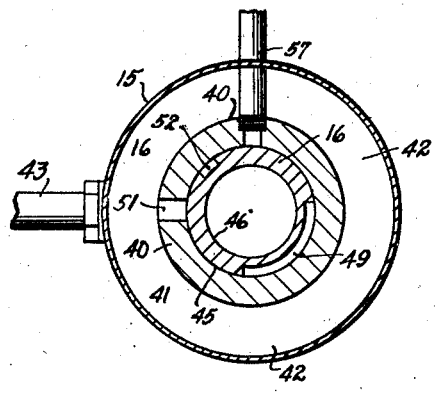
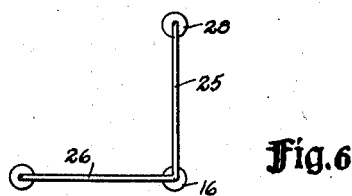
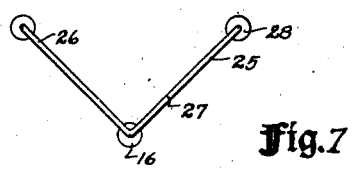
INVENTOR.
JOHN H. DOWNING
BY
HIS ATTORNEY Sept. 15, 1942.　　　J. H. DOWNING　　　2,296,152
DEVICE FOR HANDLING PHOTOGRAPHIC NEGATIVES
Filed Nov. 20, 1940　　　4 Sheets-Sheet 4

INVENTOR.
JOHN H. DOWNING
BY
HIS　ATTORNEY

Patented Sept. 15, 1942

2,296,152

UNITED STATES PATENT OFFICE 2,296,152

DEVICE FOR HANDLING PHOTOGRAPHIC NEGATIVES

John H. Downing, Cleveland, Ohio

Application November 20, 1940, Serial No. 366,392

9 Claims. (Cl. 271—5)

This invention relates to a device for handling photographic negatives more conveniently in the art of making photographic enlargements.

One of the principal objects of the present invention is to provide a simple and efficient device operable step by step to lift negatives from a stack, one at a time, successively, to transfer each negative in turn to position over an enlarging window, and then to lift each negative, in turn, from the enlarging window and to deposit it onto another stack while concurrently transporting a succeeding negative from the top of the first stack and placing it accurately in position on the enlarging window.

Another object of the present invention is to provide a device of this character by which the negative is conveniently moved to and deposited in an accurate position on the enlarging window and automatically clamped firmly in said position during the required interval.

Another object is to provide a vacuum operated transfer device for negatives so arranged that the device may be used to hold negatives in printing position without obscuring the image portions of such negatives.

A more specific object is to lift the negative from a stack by a suitable lifting device, to transport it to position over and to lower it onto the enlarging window thereby, to clamp the negative in position over said window for the time desired, then to unclamp the negative and to lift it by another lifting device and transport it to another stack while concurrently lifting a negative from the first pile by the first lifting device and placing the negative into position on the window, all by a simple manipulation of a single operating handle.

Other objects and advantages will become apparent from the following specification, wherein reference is made to the drawings, in which—

Figs. 5, 6 and 7 are diagrammatic illustrations of different operating positions of certain parts of the device;

Fig. 8 is an enlarged vertical sectional view through the axis of the valve mechanism and handle forming part of the device;

Figure 3:
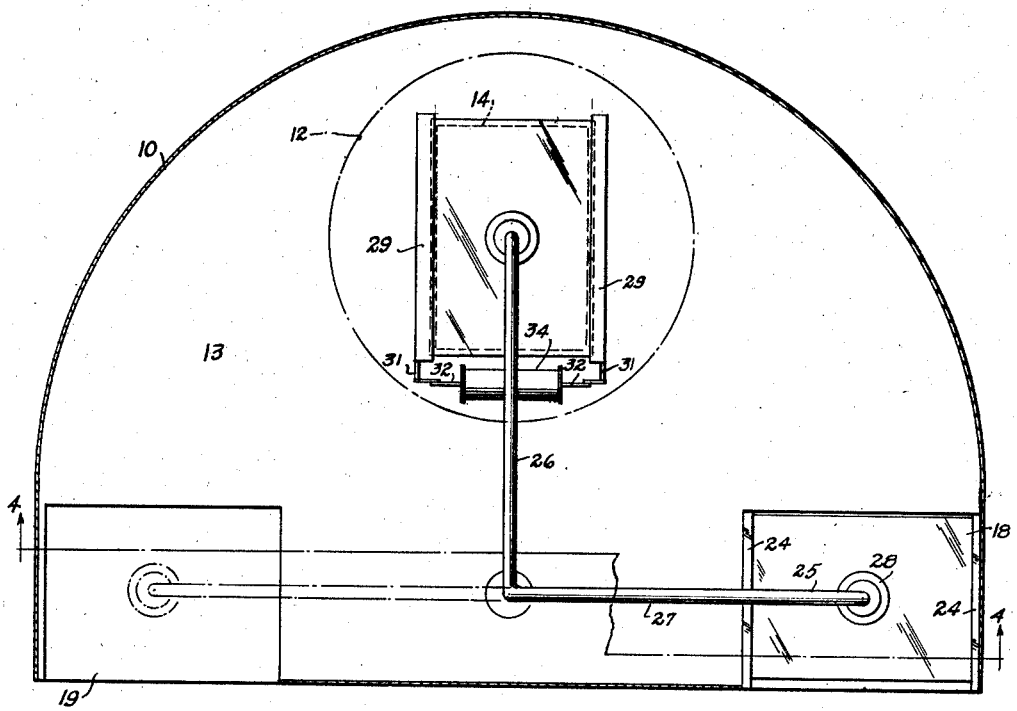
Fig. 3 is a sectional view of the device illustrated in Fig. 1 and is taken on the plane indicated by the line 3—3 in Fig. 1, the enlarging equipment with which the device is used being omitted from Fig. 3.
Figure 4:
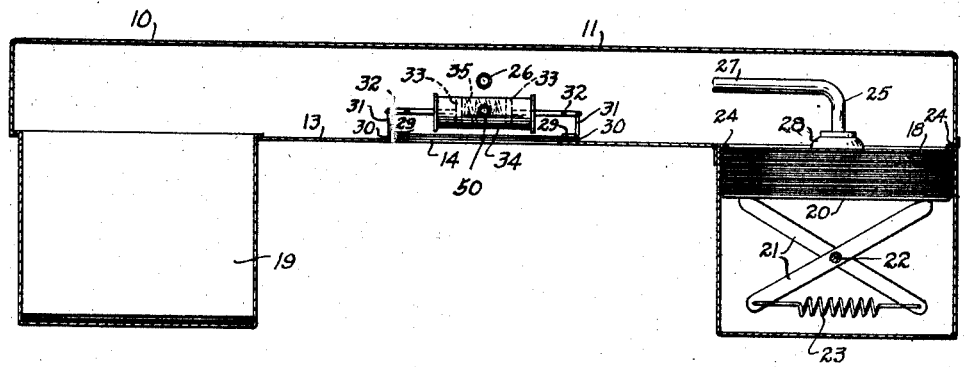
Fig. 4 is a sectional view taken on the plane indicated by the line 4—4 in Fig. 3.
Figure 11:
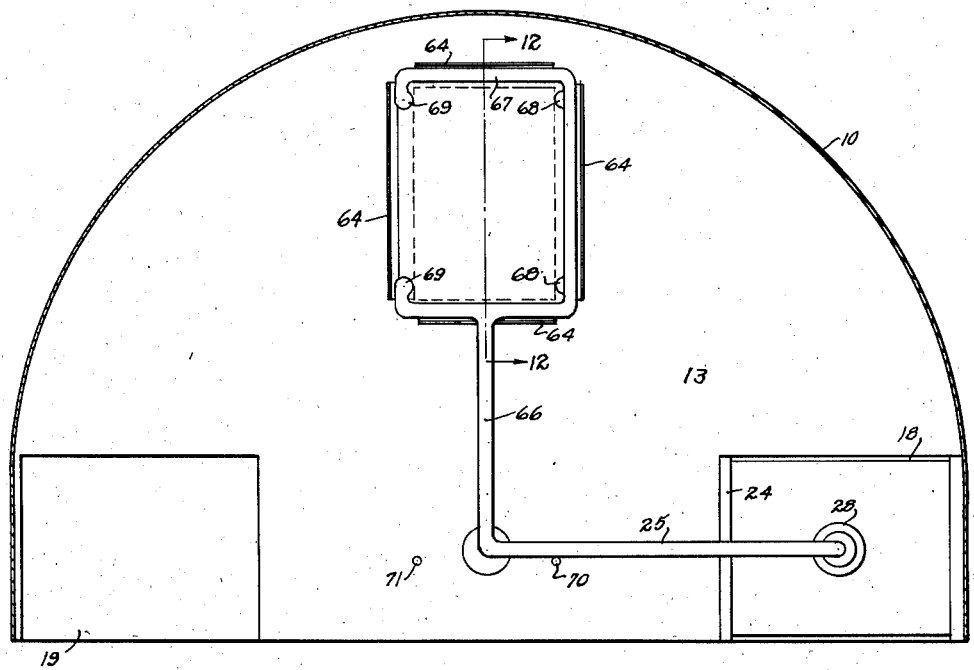
Figure 12:
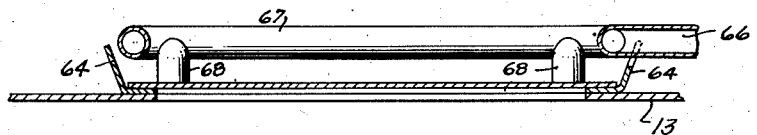

Figs. 9 and 10 are sectional views of the valve and are taken on planes indicated by the lines 9—9 and 10—10, respectively, in Fig. 8;

Fig. 11 is a plan view corresponding to Fig. 3 and showing a modified construction of one of the pick-up devices for transferring photographic negatives; and Fig. 12 is a fragmentary sectional view thereof taken as indicated by the line 12—12 on Fig. 11.

Referring first to Figs. 1 to 4, inclusive, the device of the present invention is shown in position for use in connection with a common type of enlarging apparatus. Said device can also be used for handling negatives in connection with contact printing apparatus without essential change. The enlarging apparatus comprises a light source 1 and an enlarging lens 2 mounted in a suitable holder 3 and provided with the usual adjustable bellows 4. Light from the light source 1 is projected through the interior of the bellows 4 and onto the lens 2 and thence onto a suitable table 5 on which the sensitized paper is positioned. Ordinarily in this type of equipment, a platform 6 is provided between the light source and the lens 2, this platform having an opening over which is laid the negative to be enlarged so that the light rays from the source 1 pass through the negative. This type of apparatus is well known and in common use, but a considerable amount of time is consumed in placing the negatives onto the platform in proper position and removing them during the enlarging work. Ordinarily, in commercial photography, a large number of negatives are placed in the proper order in a pile and then are taken one at a time and placed over the opening in the platform 6 for enlargement, care being taken to remove them and place them in the same order in another pile after exposure.

The present device is one adapted to perform this transporting and positioning operation more effectively, and it is interposed between the light source 1 and the top of the platform 6 and is adapted to be supported in this position.

The device of the present invention comprises essentially a housing, designated generally as 10, which has a top wall 11 with a large opening 12 therein for affording passage of light from the light source 1 into the interior of the housing. The housing 10 is fixedly secured in position between the light source 1 and the platform 6 and remains in this position during operation of the device. The housing 10 has a bottom wall 13 which overlies the platform 6 and has a window 14 in registry with the window in the platform, the window 14 being the window over which the negatives are positioned for purposes of enlargement.

Secured to the bottom wall 13 of the housing 10 is a valve sleeve 15 in which a valve piston 16 is supported for rotation and axial reciprocation. The axis of the valve sleeve extends vertically at right angles to the wall 13 and is positioned at the transverse center of the housing. On the valve piston 16 is an operating handle 17 which is adapted to be grasped in the hand of the operator for oscillating the piston and for moving the piston axially within the sleeve 15.

The housing 10 is provided with a feeding magazine 18 and a receiving magazine 19, these magazines being arranged at opposite sides of the housing and in such position relative to the window 14 that they lie at 90° from the enlarging window 14 about the axis of the sleeve 15.

The magazine 18 is preferably formed integral with the housing and is substantially open at its upper end so as to communicate with the interior of the housing 10. Within the magazine 18 is a supporting plate 20 which is movable vertically therein and which is adapted to support a pile of negatives on its upper surface. Suitable means are provided for yieldably urging the supporting plate 20 upwardly. A suitable means for this purpose may comprise a pair of levers 21 which are pivoted, as indicated at 22, between their ends and, at one end, engage the plate 20. A tension spring 23 is connected to the opposite ends of the levers 21. The pivot 22 is fixed in position in any suitable manner so that contraction of the spring operates the levers 21 so that the free ends of the levers 21 slidably engage the under side of the plate 20 and yieldably urge the plate 20 upwardly.

At the upper end of the magazine 18 are overhanging flanges 24 which are positioned to engage the lateral margins of the top negative in the pile and thus prevent the plate 20 from forcing the pile of negatives out of the top of the magazine.

The piston 16 acts as a carrier for a pair of hoisting and transporting arm devices, indicated generally at 25 and 26, which are secured in fixed spaced relation to its upper end. Since these devices are the same in all respects, the device 25 only is described in detail herein.

The arm device 25 comprises a tube 27 connected at its inner end to the piston 16 and carrying at its outer end a vacuum cup 28, the interior of the tube 27 being open to the inside of the vacuum cup. The inside of the tube 27 is in communication with a suitable duct, later to be described, in the piston 16 so that vacuum can be applied to the tube and thereby to the interior of the cup 28. The arm devices 25 and 26 are arranged at right angles to each other about the axis of the sleeve 15, so that when the device 25 is in position to lift a negative from the stack of negatives in the magazine 18, the device 26 is in position to lift from the window 14 the negative which has previously been placed on the window 14.

The devices 28 may be of rubber or other soft material so as to avoid marring the negative, but since it is unnecessary that said devices be flexible, they can be of any other material, for instance, metal.

As heretofore described, the discharge magazine 19 is arranged on the opposite side of the axis of the valve 15 and is in such position that when the device 25 has been rotated counterclockwise into a position for depositing a negative over the window 14, the device 26 is in a position for depositing a negative in the magazine 19. Thus the piston 16 provides both a simple carrier for the devices 25 and 26 and also a very effective part of the valve means, but a separate carrier and operatively connected valve means may be employed.

Mounted along opposite sides of the window 14 are clamps 29, these clamps preferably being secured to the wall 13 by suitable hinge connections 30 so as to swing from a horizontal to a vertical position. Each clamp is provided with an operating crank 31 and the cranks 31 in turn are connected to piston rods 32 of pistons 33 which operate in a cylinder 34. The cylinder 34 is connected to a source of vacuum or sub-atmospheric pressure at a point between the pistons 33, as will later be described, so that the application of sub-atmospheric pressure causes the pistons to move toward each other and move the clamps 29 into firm clamping relation with respect to the margins of any negative which overlies the window 14. A return spring 35 is interposed between the pistons 33 and is operative to open the clamps when the cylinder 34 is disconnected from the source of sub-atmospheric pressure and is vented to the atmosphere.

If desired, the piston 16 may be provided with a suitable pin or follower 36 which operates in a groove or slot 37 in a suitable sleeve 38. The sleeve 38 may be connected rigidly to the sleeve 15. The pin 36 and slot 37 are arranged to afford a guide for assisting the operator in moving the devices 25 and 26 through the proper cycle and positions.

Referring to Figs. 5, 6 and 7, the valving operations effected by the piston 16 and the sleeve 15 are such that when the devices 25 and 26 are in the rotated position illustrated in Figs. 3 and 5, the vacuum or sub-atmospheric pressure is applied to the devices 25 and 26 in all raised or lowered positions of the handle 17. Thus, with the device in operation and the handle lowered in the position illustrated in Figs. 1 and 5, the vacuum is effective through devices 25 and 26 and the vacuum cups 28 thereof to grip the top negative in the magazine 18 and the negative lying over the window 14. This vacuum is maintained while the handle is lifted, thus bending the top negative in the magazine 18 sufficiently so that its margins pass from beneath the flanges 24 and lifting the already deposited negative from the window 14. In this rotated position of the devices 25 and 26, the clamps 29 are disconnected operatively from the source of vacuum and are held in released position by the spring 35 regardless of the raised or lowered position of the handle. As the handle is then rotated 90° in a counterclockwise direction while raised, the device 26 is moved into overhanging relation to the magazine 19 and the device 25 carries the negative supported thereby into position over the window 14. At the end of this rotation, the devices 25 and 26 have moved to the positions illustrated in Fig. 6. The valving arrangement is such that while the handle is raised in this rotated position of Fig. 6, the vacuum is applied to the devices 25 and 26, but when the handle is lowered in this rotated position, the vacuum is disconnected from the devices 25 and 26. The lowering of the handle, however, positions the negative accurately over the window 14. Thus one negative is released in position over the window 14 by the device 25 and the other negative is released over the magazine 19 by the device 26 and thus drops into the stack in the magazine 19. In none of these positions is the vacuum effective for operating the clamps 29.

If next the handle is lifted, the vacuum is not applied until the device 25 is free from the negative on the window 14 and consequently no lifting of the negatives occurs. The handle may be rotated in a clockwise direction to the position indicated in Fig. 7, which breaks the connection of the vacuum to the devices 25 and 26. When the handle is lowered in the position illustrated in Fig. 7, the valving operation is such that vacuum is applied to the cylinder 34, thus operating the pistons 33 to move the clamps 29 into clamping engagement with the negative over the window 14. Under these conditions, the devices 25 and 26 do not obstruct the negative on the window 14 and the light source can be operated to effect the enlarging operation, after which the handle may be rotated in a clockwise direction back into the position illustrated in Fig. 5. Thereupon the successive operations are repeated in the same order.

Thus, the device 25 transports the negative to the window 14, and the other device 26 removes it from the window 14 and releases it over the discharge magazine at the same times that the device 25 transports another negative to the window and releases such other negative at the window. Very rapid operation can be effected in this manner with assurance that the negatives will be stacked essentially in the same order as they were originally, or in other words, so that they check accurately with the order in which they were placed in the original stack.

Figures 1, 2:
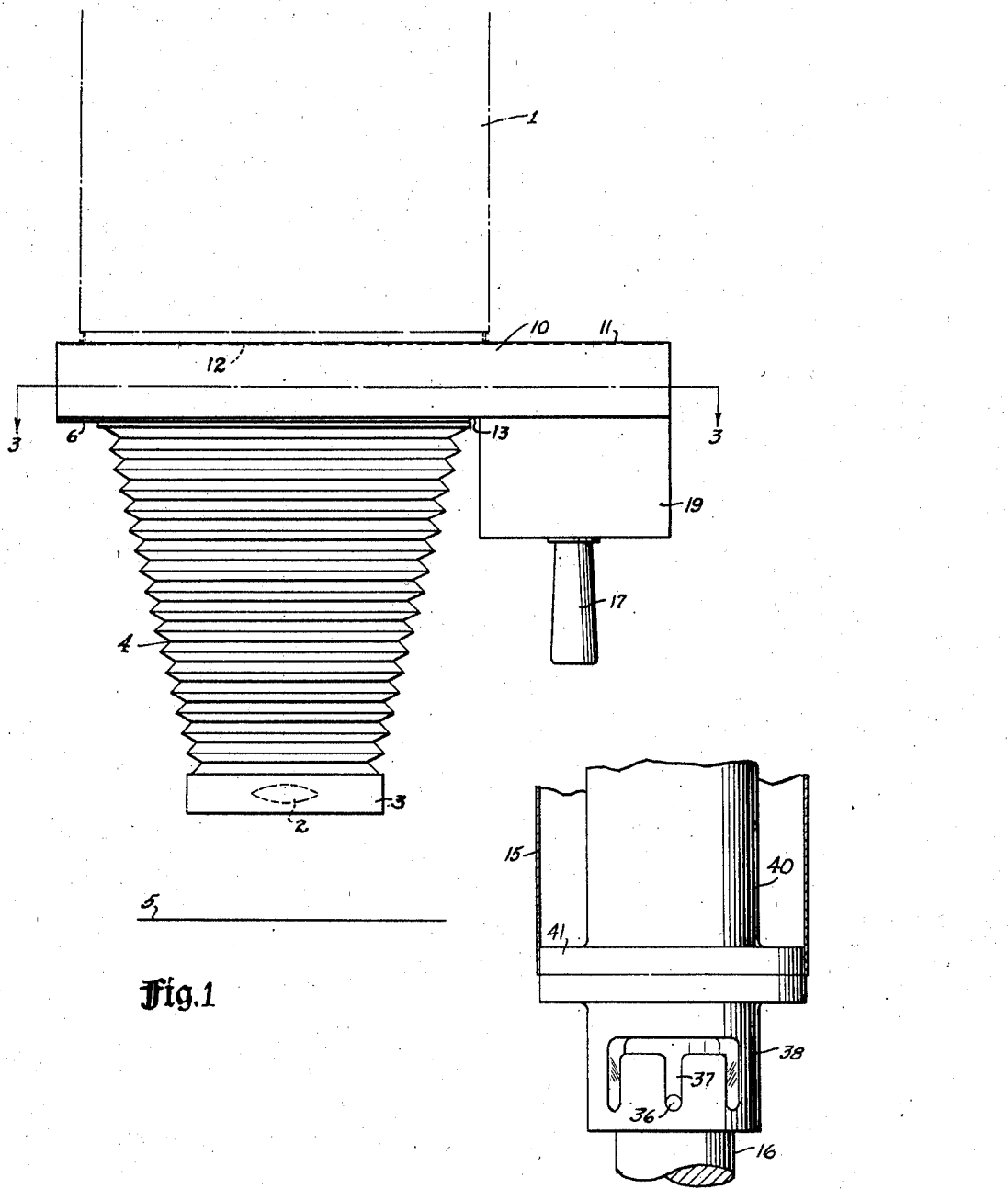
Fig. 1 is a side elevation of a device embodying the principles of the present invention and illustrating the device in relation to the enlarging equipment with which it is adapted for use.
Fig. 2 is a fragmentary front elevation of the valve mechanism of the device.

It will be noted from Fig. 2 that the slot 37 and pin 36 are so arranged that the raising or lowering by the operator is guided accurately by contact of the pin and the slot. By rearrangement of the slots, the proper raising and lowering movements could be effected simply as a result of turning of the handle.

The fit of the pistons 33 in the cylinder 34 is preferably such that outside atmosphere can leak in around the pistons in sufficient quantities to permit the spring 35 to spread the pistons apart when the vacuum is no longer applied and the vacuum is sufficiently strong when applied to overcome this leakage and operate the pistons.

In order to effect the valving cooperation for performing the operations recited, there is provided within the sleeve 15 a valve element 40 which is generally cylindrical in form and has annular external flanges 41 at or adjacent its ends. The flanges 41 fit accurately within the cylinder 15 and are sealed thereto and thus define an annular cavity 42 which is constantly connected through a suitable pipe 43 with a source of sub-atmospheric pressure. In the wall of the valve element 40 is a radial port 44 which connects the annular cavity 42 with an axial bore 45 of the element 40. The piston 16 is accurately fitted in the axial bore 45 and is rotatable and movable axially therein. The piston 16 likewise has a central bore 46 which at one end is connected to both of the tubes of the devices 25 and 26. In the side wall of the piston 16 is a port 47 which, when the handle is lowered in the rotated position illustrated in Fig. 5, is in registry with the port 44, thus connecting the devices 25 and 26 to the source of vacuum or sub-atmospheric pressure through the ports 44 and 47 and the bore 46. Since this vacuum must be maintained in both raised and lowered positions of the handle, a suitable groove 48 is provided in the piston 16 and extends lengthwise of the piston 16 a distance equal to the permitted vertical movement of the piston and is connected at its upper end with the port 47. The lower end of the groove 48 communicates with a circumferential groove 49 extending around the piston an angular distance of 90°, clockwise as viewed in Fig. 9, from the lower end of said groove 48. Thus the bore 46 of the piston is subjected to sub-atmospheric pressure while the piston is lowered in its initial position (cf. Fig. 5), during raising of the piston to its upper limit of movement, and then during the entire turning of the piston to dispose the transporting arm devices 25 and 26 into the position shown in Fig. 6. The port 44 is kept in communication with the port 47, during raising and turning of the piston as just mentioned, through the intermediary of the grooves 48 and 49.

With this arrangement of ports, it is apparent that when the piston is rotated to the neutral position illustrated in Fig. 7, and then lowered to disalign the port 44 and groove 49, the devices 25 and 26 are disconnected from the source of sub-atmospheric pressure. As mentioned, however, it is necessary that the vacuum or sub-atmospheric pressure be applied to the cylinder 34 when the handle is down in neutral position and be disconnected from the cylinder 34 when the handle is raised, as during transportation of negatives by movement past the neutral position. In order to effect this operation, a suitable tube 50 is connected to the cylinder 34 between the pistons 33 and extends through the annular cavity 42 and wall of the valve element 40, its inner end opening through the inner surface of the valve bore 45 of the element 40. The inner opening of the tube 50 is located opposite the port 44 and directly below said inner opening the wall of the valve element 40 has a port 51. When the arm devices 25 and 26 are in their positions shown in Figs. 5 and 6, and whenever the piston is in raised position, the piston maintains the tube 50 and port 51 discommunicated. For communicating the same in the neutral and lowered position of the piston (cf. Fig. 7) the piston has a longitudinally extending groove 52 angularly displaced 45° from the tube 50 and port 51 in a clockwise direction as viewed in Figs. 9 and 10. The ends of the groove align with the tube 50 and port 51, thus allowing vacuum to be applied to the cylinder 34 through the tube 50 when the arm devices 25 and 26 are in the Fig. 7 position and the piston is lowered. This causes the clamps 29 to be swung downwardly against a negative at the printing window. Upon raising of the piston in the neutral position, vacuum in the tube 50 can be broken by communicating the tube 50 with a vent tube 53 leading from the bore 45 of the valve element 40 through the outer wall 15, as shown in Fig. 8. In such raised position the groove 52 is moved out of alignment with the port 51 and into communication with the inner ends of both tubes 50 and 53.

Breaking of vacuum to the arm devices 25 and 26, through the bore 46 of the piston, can be accomplished when the arm devices are in the negative release position (Fig. 6) by placing an air bleeder tube 57 with its inner end extending into the valve in communication with the bore 45 of the valve element 40 at such an elevation that it will become aligned with the vertical groove 48 of the piston as the piston is lowered in the position thereof corresponding to Fig. 6. Such air bleeder tube can have its inner end situated at the elevation thereof shown on Fig. 8 so that it cannot communicate with any portion of the L-shaped groove 48, 49 and thence with the port 47 leading from said groove into the piston chamber 46, in any position except that in which the negative hoisting devices 28 have been poised over the printing window and discharge magazine respectively and lowered somewhat in that position.

Referring to Figs. 11 and 12, these show an arrangement by which the function of the clamps 29 and operating mechanism therefor may be performed by one of the arms of the carrier unit which transfers the negatives from one position to another. The modification comprises principally the adaptation of one of the arms so that its hoisting device contacts with the negatives only at the margins thereof. As shown in Fig. 11, a tubular arm 66 (corresponding to the arm 26 of Figs. 3 and 5 to 7, inclusive) extends as at 67 partially around the negative to be picked up and transferred. The portion 67 has depending hollow extensions 68 and 69 terminating in the same horizontal plane and serving to apply vacuum to the negatives to pick them up and mechanical pressure to the margins to hold the negatives in place while printing. All portions of the arm 66 lie outwardly beyond the margins of the image on the negative so as not to obstruct the image portions for printing. The modification illustrated is adapted principally for small negatives, but the depending extensions 69 may be amplified so as to apply pressure all along all margins of the negatives in case large negatives are to be handled thereby.

As will be seen, the modified arrangement avoids having to swing the transfer arms into a neutral position (such as shown in Fig. 7) to enable clamping of the negative at the printing station. Suitable fixed guides 64 (Fig. 12) may be positioned adjacent the enlarging window so as to make sure that the negatives, when released by the arm 25, will fall into registration with the window.

The valve for applying sub-atmospheric pressure at the hoisting devices of the two arms and relieving said pressure at the proper times can be the same as that illustrated in Figs. 8, 9 and 10, but, since the modified arrangement requires no clamping devices 29 for the negatives or operating piston and cylinder therefor, the tubes 50 and 53 and groove 52 are omitted. Because the modified carrier has only two positions of rest, namely that shown in Fig. 11 and one corresponding to the position of the arms 25 and 26 shown in Fig. 6, it is only necessary to provide stops as at 70 and 71 on the platform 13 for abutment with the arms 25 and 66 respectively, in order to insure that the arms are lowered in the proper positions: (a) to pick up a negative from the magazine and concurrently pick up the negative which has just been printed, and, (b) to release the negative which has been transferred from the magazine to printing position by the arm 25 and to release the negative which has been transferred from the printing window to discharge position by the arm 66.

Vacuum is applied to all suction termini automatically when the carrier is lowered in the position shown in Fig. 11, continues to be applied during raising and swinging of the arms to the second position (cf. Fig. 6) and is released when the arms are partly lowered in the latter position. It is usually unnecessary to supply air at atmospheric pressure through the valve, as by means of the bleeder pipe 57, for releasing the negatives, because as soon as the valve operates to cut off communication between the bore 46 of the piston and the suction pipe 43 (as when the groove 49 is lowered out of registration with the port 44 in the position shown in Fig. 6), enough air will leak in adjacent one or the other of the negatives to render both pick-up devices inoperative to hold their respective negatives. Thus (assuming the bleeder pipe 57 is omitted from the construction), by leaving the arms for an instant in lowered position, with the device 28 of the arm 25 over the window and the device 67—69 over the discharge receptacle, both negatives will be released; and, as soon as the carrier is raised for return movement back to original position, suction is again established to the hoisting devices of both arms and remains established while the arms are swung to original position, are lowered to make contact with respective negatives and then raised and swung back to negative release position.

The device herein illustrated and described is effective for its intended purpose, simple in operation, and economical to manufacture. Modifications may be made in the valve and the specific elements, if desired, without departing from the spirit of the invention as outlined in the appended claims.

Having thus described my invention, I claim:

1. A device for the purposes described, comprising a body member having a printing window therein, a magazine, constantly acting means associated with the magazine and adapted to present the top of a stack of photographic negatives serially into a predetermined position substantially in the plane of the window, a carrier, means supporting the carrier for movement normal to the plane of the window and for movement parallel to said plane, two lifting devices mounted on the carrier and spaced apart so that when the carrier is moved to dispose one of said devices adjacent the magazine, the other device is moved adjacent the window, and the said other device moved away from the window when the carrier is moved to dispose said one device adjacent the window, means for rendering both devices operative to attach themselves to negatives, respectively, when the devices are moved normal to the plane of the window to a starting position wherein the said one device is adjacent the magazine and also while the devices are moved to transfer respective negatives from the magazine to the window and from the window to a point remote from the window and for rendering said devices inoperative in the latter positions whereby to release negatives in said latter positions.

2. A device for the purposes described and comprising a body member having a printing window therein, a magazine for accommodating a stack of photographic negatives, means in the magazine for feeding the negatives perpendicular to their principal planes into a predetermined position substantially in the plane of the window, a carrier, means supporting the carrier for oscillation about an axis normal to the plane of the window and for movement axially, a plurality of lifting devices mounted on the carrier and angularly spaced about the axis of said carrier so that when the carrier is rotated to dispose one of said devices adjacent the magazine, the other device is moved adjacent the window, and the said other device moved away from the window when the carrier is moved to dispose said one device adjacent the window, means operated by the carrier incident to movement thereof for rendering both devices operative to attach themselves to negatives, respectively, when the devices are lowered in a starting position wherein the said one device is adjacent the magazine and also while the devices are lifted and rotated to transfer respective negatives from the magazine to the window and from the window to a point remote from the window and for rendering said devices inoperative in the latter positions whereby to release negatives in said latter positions.

3. A device for the purposes described, comprising a body member having a printing window therein, a magazine for accommodating a stack of photographic negatives, means on the magazine arranged for feeding the negatives flatwise into a predetermined position with their faces parallel to the plane of the window, a carrier, means supporting the carrier for oscillation about an axis normal to the plane of the window and for movement axially, a pair of lifting devices operable to become attached to the flat faces of negatives, said devices being mounted on the carrier and angularly spaced about the axis of said carrier so that when the carrier is rotated to dispose one of said devices in operative alignment with the magazine the other device is moved into operative alignment with the window, and the said other device is moved out of operative alignment with the window when the carrier is rotated to dispose said one device in operative alignment with the window, means operated by said carrier for rendering both devices operative to attach themselves to negatives, respectively, when the carrier is moved to lower the devices to a starting position wherein the said one device is operatively aligned with the magazine and also while the carrier is moved to lift the devices and rotate them to a final position wherein said one device is operatively aligned with said window, said last named means being rendered operative by the carrier when the carrier is lowered in the said final position thereof for rendering both devices inoperative.

4. A device for the purposes described, comprising a body member having a printing window therein, a magazine for accommodating a stack of photographic negatives and for feeding the negatives of the stack flatwise into a predetermined position with their faces parallel to the plane of the window, a carrier means pivotally mounting the carrier for oscillation about an axis normal to the plane of the window and for movement axially, a pair of suction lift devices on the carrier and in a fixed spaced relation to each other such that when one of said devices is operatively aligned with the magazine the other of said devices is operatively aligned with the window, and valve means coaxial with the carrier mounting means and operative in a fixed relation with respect to the movement of the carrier to connect both of the suction lift devices to a source of subatmospheric pressure when the devices are lowered into a starting position, wherein said one of said devices can engage the top face of the top negative of the stack and the other can engage a negative which lies over the window, and also while the devices are lifted and rotated to a final position wherein said one of the devices operatively aligns with said window, and further operative to disconnect both devices from the source of sub-atmospheric pressure when the carrier is lowered in the said final position, whereby the said one of said devices can lift a negative from the stack and transport it into position over the window while the other device concurrently can lift a negative from the window and transport it to a position away from the window.

5. A device for the purposes described, comprising a body member having an enlarging window, a magazine adapted for presenting photographic negatives in a predetermined position, a valve housing on the member and having a valve bore with its axis normal to the plane of the window, a valve piston oscillatable and reciprocable in said bore, clamping means adjacent the window and operable for clamping a negative in position over said window, two suction lift devices supported by the carrier and angularly spaced relative to each other about the axis of the piston so that when the piston is rotated to dispose one of the devices in alignment with the magazine, the other device is in alignment with the window, means for connecting the housing to a source of sub-atmospheric pressure, said piston and housing having valve port means which are rendered cooperative by movement of the piston to different rotated and reciprocated positions, and said port means being cooperative, when the piston is rotated to a starting position wherein said one device is aligned with the magazine, to connect both the suction lift devices to said source of sub-atmospheric pressure both when the devices are lowered in said starting position for engagement of said one device with the negative in the magazine and while the devices are lifted and rotated to a final position wherein said one of the devices is aligned with the window, and said ports further being cooperative to disconnect the devices from the source of sub-atmospheric pressure upon lowering of the piston while it is in said final position, and further operative to connect said clamping means to, and disconnect the said devices from, said source of sub-atmospheric pressure when the piston is moved to an intermediate position.

6. Photographic negative handling apparatus comprising means providing a storage station, a printing station and a discharge station for the negatives, a carrier having two pick-up devices in fixed relation to each other such that when one device is in position to pick up a negative from the storage station, the other device is in position to pick up a negative from the printing station, means guiding the carrier for raising and lowering movement to pick up and deposit negatives concurrently and to transport the pick-up devices to printing and discharge positions from their initial positions, and means to render the devices effective and ineffective to retain negatives thereon, one of the devices engaging only marginal portions of the negatives to be picked up and transported thereby, so that said one device can occupy the position in which it picks up and deposits negatives at the printing station without interfering with printing through said negatives.

7. A photographic negative handling means for photographic printing apparatus, comprising means providing a storage station, a printing station and a receiving station for negatives arranged in the order mentioned in equiangularly spaced relationship about a common center, a pair of rigid tubular arms converging to said center at approximately the same angle as the spacing of adjacent stations, suction pick-up members on respective arms communicating with the tubular interiors thereof and positioned for engagement with the negatives at said stations, a common mounting for the arms at said center, and valve means associated with the mounting and arranged for applying suction to both arms simultaneously when over respective relatively adjacent stations whereby to pick up negatives at said stations, to maintain the suction while each arm is moved through the angle of spacing of the stations whereby to transfer the negatives to new stations and then to release said suction for depositing the negatives at the new stations.

8. Negative handling means according to claim 7 wherein the mounting is a hollow cylindrical valve member communicating with the arms and rigid therewith and a cooperating fixed guide for the valve member, said valve member being slidable axially in the guide for enabling movement of the pick-up members toward and away from negatives at said stations and rotatable therein for effecting transfer of the negatives, the valve member and guide having coacting ports for applying and cutting off suction to the pick-up members in different relative positions of the valve member and guide.

9. A photographic negative handling mechanism comprising a table having a printing window thereon and storage receptacles for printed and unprinted negatives at respective sides of the window in equiangularly spaced relation thereto about a common center, a carrier pivoted to the table at said center on an axis perpendicular to the plane of the table, negative pick-up devices on the carrier disposed over the table and equiangularly spaced about the pivot so as to register one with the window and one with a receptacle, a handle on the carrier at said center projecting away from the plane of the table, means to cause the pick-up devices to become simultaneously operative to retain and release negatives, said means being controlled automatically by the handle in moving the carrier to positions appropriate to picking up, transferring and releasing the negatives.

JOHN H. DOWNING.